(12) United States Patent
Gozdz et al.

(10) Patent No.: US 7,261,979 B2
(45) Date of Patent: Aug. 28, 2007

(54) LITHIUM SECONDARY CELL WITH HIGH CHARGE AND DISCHARGE RATE CAPABILITY

(75) Inventors: Antoni S. Gozdz, Marlborough, MA (US); Andrew C. Chu, Cambridge, MA (US); Yet Ming Chiang, Framingham, MA (US); Gilbert N. Riley, Jr., Marlborough, MA (US)

(73) Assignee: A123 Systems, Inc., Watertown, MA (US)

( * ) Notice: Subject to any disclaimer, the term of this patent is extended or adjusted under 35 U.S.C. 154(b) by 0 days.

(21) Appl. No.: 11/076,556

(22) Filed: Mar. 9, 2005

(65) Prior Publication Data

US 2005/0233220 A1 Oct. 20, 2005

Related U.S. Application Data

(63) Continuation of application No. 11/052,971, filed on Feb. 7, 2005.

(60) Provisional application No. 60/542,550, filed on Feb. 6, 2004.

(51) Int. Cl.
*H01M 4/58* (2006.01)
(52) U.S. Cl. .............................. 429/231.95; 429/218.1
(58) Field of Classification Search ........... 429/231.95, 429/231.8, 224, 221, 223, 231.5, 231.6, 50
See application file for complete search history.

(56) References Cited

U.S. PATENT DOCUMENTS

| 4,302,518 A | 11/1981 | Goodenough et al. |
| 4,423,125 A | 12/1983 | Basu |
| 4,615,959 A | 10/1986 | Hayashi et al. |

(Continued)

OTHER PUBLICATIONS

Peled, E. "Lithium Stability and Film Formation in Organic and Inorganic Electrolyte for Lithium Battery Systems" in *Lithium Batteries*, J.P. Gabano, Ed. Academic Press, London, 1983, p. 43.

(Continued)

*Primary Examiner*—Jonathan Crepeau
*Assistant Examiner*—Monique Wills
(74) *Attorney, Agent, or Firm*—Wilmer Cutler Pickering Hale and Dorr LLP

(57) ABSTRACT

A high capacity, high charge rate lithium secondary cell includes a high capacity lithium-containing positive electrode in electronic contact with a positive electrode current collector, said current collector in electrical connection with an external circuit, a high capacity negative electrode in electronic contact with a negative electrode current collector, said current collector in electrical connection with an external circuit, a separator positioned between and in ionic contact with the cathode and the anode, and an electrolyte in ionic contact with the positive and negative electrodes, wherein the total area specific impedance for the cell and the relative area specific impedances for the positive and negative electrodes are such that, during charging at greater than or equal to 4C, the negative electrode potential is above the potential of metallic lithium. The current capacity per unit area of the positive and negative electrodes each are at least 3 mA-h/cm$^2$, the total area specific impedance for the cell is less than about 20 Ω-cm$^2$, and the positive electrode has an area specific impedance $r_1$ and the negative electrode has an area specific impedance $r_2$, and wherein the ratio of $r_1$ to $r_2$ is at least about 10.

55 Claims, 7 Drawing Sheets

U.S. PATENT DOCUMENTS

| | | |
|---|---|---|
| 4,957,833 A | 9/1990 | Daifuku et al. |
| 5,538,814 A | 7/1996 | Kamauchi et al. |
| 5,612,155 A | 3/1997 | Takami et al. |
| 5,705,296 A * | 1/1998 | Kamauchi et al. .......... 429/330 |
| 5,795,678 A | 8/1998 | Takami et al. |
| 5,910,382 A | 6/1999 | Goodenough et al. |
| 5,948,569 A | 9/1999 | Moses et al. |
| 6,022,640 A | 2/2000 | Takada et al. |
| 6,136,472 A | 10/2000 | Barker et al. |
| 6,146,791 A | 11/2000 | Loutfy et al. |
| 6,153,333 A | 11/2000 | Barker |
| 6,165,646 A | 12/2000 | Takada et al. |
| 6,200,704 B1 | 3/2001 | Katz et al. |
| 6,221,531 B1 | 4/2001 | Vaughey et al. |
| 6,242,132 B1 | 6/2001 | Neudecker et al. |
| 6,248,477 B1 | 6/2001 | Howard, Jr. et al. |
| 6,255,017 B1 | 7/2001 | Turner |
| 6,277,522 B1 | 8/2001 | Omaru et al. |
| 6,294,292 B1 | 9/2001 | Tsushima et al. |
| 6,337,156 B1 | 1/2002 | Narang et al. |
| 6,346,343 B1 | 2/2002 | Notten et al. |
| 6,391,488 B1 | 5/2002 | Shimizu et al. |
| 6,391,493 B1 | 5/2002 | Goodenough et al. |
| 6,391,494 B2 | 5/2002 | Reitz et al. |
| 6,428,933 B1 | 8/2002 | Christensen et al. |
| 6,447,946 B1 | 9/2002 | Nakai et al. |
| 6,455,198 B1 | 9/2002 | Kitoh et al. |
| 6,479,186 B1 | 11/2002 | Nemoto et al. |
| 6,482,548 B2 | 11/2002 | Amatucci |
| 6,503,646 B1 | 1/2003 | Ghantous et al. |
| 6,511,773 B1 | 1/2003 | Dampier |
| 6,514,640 B1 | 2/2003 | Armand et al. |
| 6,528,212 B1 | 3/2003 | Kusumoto et al. |
| 6,596,430 B2 | 7/2003 | Nemoto et al. |
| 6,596,439 B1 | 7/2003 | Tsukamoto et al. |
| 6,617,073 B1 | 9/2003 | Matsumoto et al. |
| 6,641,953 B2 | 11/2003 | Takeuchi et al. |
| 6,645,667 B1 | 11/2003 | Iwamoto et al. |
| 6,656,635 B2 | 12/2003 | Okawa et al. |
| 6,682,849 B2 | 1/2004 | Narang et al. |
| 6,716,332 B1 | 4/2004 | Yoshioka et al. |
| 6,730,429 B2 | 5/2004 | Thackeray et al. |
| 6,733,925 B2 | 5/2004 | Hironaka et al. |
| 6,740,446 B2 | 5/2004 | Corrigan et al. |
| 6,753,111 B2 | 6/2004 | Kweon et al. |
| 6,773,838 B2 | 8/2004 | Suzuki et al. |
| 6,794,036 B2 | 9/2004 | Matsumoto et al. |
| 6,800,399 B2 | 10/2004 | Matsumoto |
| 6,803,149 B2 | 10/2004 | Nakai et al. |
| 6,811,919 B2 | 11/2004 | Nemoto |
| 6,814,764 B2 | 11/2004 | Hosoya et al. |
| 6,815,122 B2 | 11/2004 | Barker et al. |
| 6,830,848 B1 | 12/2004 | Fujiwara et al. |
| 6,832,171 B2 | 12/2004 | Barsoukov et al. |
| 6,852,446 B2 | 2/2005 | Barbarich |
| 6,858,345 B2 | 2/2005 | Amine et al. |
| 6,858,348 B2 | 2/2005 | Kitoh |
| 6,878,487 B2 | 4/2005 | Cho et al. |
| 6,878,490 B2 | 4/2005 | Gao et al. |
| 6,884,544 B2 | 4/2005 | Barker et al. |
| 6,884,546 B1 | 4/2005 | Fujita et al. |
| 6,890,686 B1 | 5/2005 | Barker et al. |
| 6,908,711 B2 | 6/2005 | Fauteux et al. |
| 2001/0033972 A1 | 10/2001 | Kawai et al. |
| 2001/0053484 A1 | 12/2001 | Takeuchi et al. |
| 2002/0028380 A1 | 3/2002 | Tanjo et al. |
| 2002/0074972 A1 | 6/2002 | Narang et al. |
| 2002/0081485 A1 | 6/2002 | Takekawa et al. |
| 2002/0102459 A1 | 8/2002 | Hosoya et al. |
| 2002/0106563 A1 | 8/2002 | Okawa et al. |
| 2002/0110736 A1 | 8/2002 | Kweon et al. |
| 2002/0122983 A1 | 9/2002 | Nakai et al. |
| 2002/0182497 A1 | 12/2002 | Kohzaki et al. |
| 2003/0118904 A1 | 6/2003 | Hosokawa et al. |
| 2003/0129492 A1 * | 7/2003 | Barker et al. .............. 429/221 |
| 2003/0129496 A1 | 7/2003 | Kasai et al. |
| 2003/0180617 A1 | 9/2003 | Fujimoto et al. |
| 2003/0194601 A1 | 10/2003 | Lei |
| 2003/0194605 A1 | 10/2003 | Fauteux et al. |
| 2004/0005265 A1 | 1/2004 | Chiang et al. |
| 2004/0023118 A1 | 2/2004 | Kinoshita et al. |
| 2004/0053134 A1 | 3/2004 | Ozaki et al. |
| 2004/0058244 A1 | 3/2004 | Hosoya et al. |
| 2004/0091779 A1 | 5/2004 | Kang et al. |
| 2004/0096740 A1 | 5/2004 | Fukuzawa et al. |
| 2004/0121195 A1 | 6/2004 | Ghantous et al. |
| 2004/0131934 A1 | 7/2004 | Sugnaux et al. |
| 2004/0151951 A1 | 8/2004 | Hyung et al. |
| 2004/0185343 A1 | 9/2004 | Wang et al. |
| 2004/0258986 A1 | 12/2004 | Shen et al. |
| 2004/0265695 A1 | 12/2004 | Barker et al. |
| 2005/0003274 A1 | 1/2005 | Armand et al. |
| 2005/0058905 A1 | 3/2005 | Barker et al. |
| 2005/0064282 A1 | 3/2005 | Inagaki et al. |
| 2005/0069758 A1 | 3/2005 | Kitao et al. |
| 2005/0069775 A1 | 3/2005 | Hwang et al. |
| 2005/0142442 A1 | 6/2005 | Yuasa et al. |
| 2006/0035150 A1 * | 2/2006 | Audemer et al. .......... 429/221 |

OTHER PUBLICATIONS

Yang et al. "Evaluation of Electrochemical Interface Area and Lithium Diffusion Coefficient for a Composit Graphite Anode" Journal of the Electrochemical Society, vol. 151, pp. A1247-A1250 (2004).

D. Aurbach et al, Journal of Electrochemical Society, 147(4) 1274-9 (2000).

Abraham, K. M. et al., "Discharge Rate Capability of the $LiCoO_2$ Electrode," J. Electrochem. Soc., vol. 145, No. 2, p. 482-486, Feb. 1998.

* cited by examiner

LITHIUM SECONDARY CELL WITH HIGH CHARGE AND DISCHARGE RATE CAPABILITY

RELATED APPLICATIONS

This application is a continuation of U.S. patent application Ser. No. 11/052971, filed Feb. 7, 2005, entitled "Lithium Secondary Cell with High Charge and Discharge Rate Capability," which claims priority under 35 U.S.C. §119(e) to U.S. Provisional Patent Application No. 60/542,550, filed Feb. 6, 2004, entitled "Non-Aqueous Electrolyte Secondary Cell with High Charge and Discharge Rate Capability," both of which are hereby incorporated in their entirety by reference.

BACKGROUND OF THE INVENTION

1. Field of the Invention

This invention relates to a non-aqueous electrolyte secondary cell. In particular, the invention relates to a battery having a fast charge and discharge rate capability and low rate of capacity fade during such high rate cycling.

2. Description of the Prior Art

Contemporary portable electronic appliances rely almost exclusively on rechargeable Li-ion batteries as the source of power. This has spurred a continuing effort to increase their energy storage capability, power capabilities, cycle life and safety characteristics, and decrease their cost. Lithium-ion battery or lithium ion cell refers to a rechargeable battery having an anode capable of storing a substantial amount of lithium at a lithium chemical potential above that of lithium metal.

Historically, non-aqueous secondary (rechargeable) cells using metallic lithium or its alloys as the negative electrode were the first rechargeable cells capable of generating high voltages and having high energy density. However, early on it became clear that their capacity decreased rapidly during cycling, and that their reliability and safety were impaired by the growth of the so-called mossy lithium and lithium dendrites to a degree that precluded these cells from the consumer market. Importantly, the few lithium-metal rechargeable batteries which, from time to time, were being actively marketed, were recommended to be charged at a rate no higher than ca. C/10 (10-hour) rate to minimize the dendritic growth.

To counteract the slow but unavoidable reaction of lithium with the electrolyte components, these early cells typically contained a 4–5 times excess of metallic lithium as compared with the capacity of the positive active material. Thus, the observed capacity fade during cycling was caused by a decrease in the specific capacity of the positive active material. An up-to-date review of lithium-metal batteries is available (D. Aurbach et al., *Journal of Electrochemical Society*, 147(4) 1274–9 (2000)).

To overcome the difficulties associated with the use of lithium metal negative electrodes, several major improvements in battery materials were introduced. Various types of carbon capable of highly efficient and reversible intercalation of lithium at low potentials were used as the negative electrode to eliminate the growth of lithium dendrites. See, U.S. Pat. Nos. 4,423,125 and 4,615,959. Highly conductive liquid electrolytes have been developed, which are stable at both low and high potentials vs. lithium. See, U.S. Pat. No. 4,957,833. High-voltage, high-capacity positive electrode materials based on lithiated transition metal oxides, such as $LiCoO_2$, $LiMn_2O_4$ and $LiNiO_2$ have been developed. See, U.S. Pat. No. 4,302,518.

Since the electrochemical potential of lithium metal is only ca. 0.1 V lower than the potential of the fully lithiated graphitic carbon electrodes, $LiC_6$, used in Li-ion batteries, both are strongly reducing towards any materials in contact with them, such as the polymer binder and the liquid electrolyte lithium salt solution. In particular, liquid electrolyte components react with both metallic lithium and lithiated carbon to form a metastable protective layer on the surface of the negative electrode materials, the so-called solid-electrolyte interface (SEI) (E. Peled, "*Lithium Stability and Film Formation in Organic and Inorganic Electrolyte for Lithium Battery Systems*," in "*Lithium Batteries*," J. -P. Gabano, Ed., Academic Press, London, 1983; p. 43).

However, the process of SEI formation and its partial renewal during battery cycling and storage irreversibly consumes a fraction of the active lithium from the battery and results in a loss of capacity. This loss is readily visible when one compares the amount of charge used during the first charge and then the discharge of the battery, a so-called formation cycle. During the first charge cycle of a new Li-ion battery, the positive active material is oxidized and $Li^+$ ions diffuse in the liquid electrolyte towards the carbon negative electrode, where they are reduced to $Li^0$ and intercalated between the graphene layers of the carbon structure. A fraction of this first-reduced lithium, up to ca. 50%, but more typically between 5 and 15% of the intercalatable lithium, reacts to form the above-mentioned SEI. Clearly, the amount of Li available in the positive electrode material has to be less than the sum of lithium necessary for the formation of the SEI and the available lithium intercalation capacity of the carbon material. If the amount of lithium removed from the positive electrode material is greater than that sum, the excess lithium will be deposited, or plated, as metallic lithium on the external surfaces of the carbon particles. The plated lithium is in the form of a very reactive high-surface-area deposit, so-called 'mossy lithium', which will not only degrade the battery performance due to its high electrical impedance, but will also seriously compromise its safety.

Even if the lithium intercalation capacity of the carbon material is large enough to accommodate all of the lithium from the positive electrode material, it is possible to plate lithium if the charging is done too quickly.

Due to the strong possibility of lithium plating on the carbon anode during the high-rate charge, manufacturers of Li-ion batteries recommend that such batteries are charged at an equivalent current no greater than one time the nominal cell capacity (1C) until the upper maximum charging voltage is reached, followed by a constant-current (taper) segment (http://www.panasonic.com/industrial/battery/oem/images/pdf/Panasonic_LiIon_Charging.pdf). In practice, the charging step lasts from 1.5 to 2.5 hours, which is too long for certain applications, such as battery-powered tools, certain electronic devices and electric vehicles.

It is the object of the present invention to provide a Li-ion battery capable of high charge and discharge rates, inexpensive to make, safe during extended high-electrical-stress use, having high energy and power capability, and exhibiting low capacity and discharge power loss after numerous high-rate charge and discharge cycles.

SUMMARY OF THE INVENTION

In one aspect, a secondary cell and secondary cell manufacturing and cycling methods that are useful in high-rate applications are provided. The positive lithium storage electrode and the negative electrode are both capable of reversibly intercalating lithium at a high rate. The cell does not plate lithium during charging, resulting in reduced capacity fade over many charge cycles. Thus, the high-performance lithium-ion cell is capable of repeated, safe and stable charge and discharge at exceptionally high rates of charge and discharge. For example, such a battery can be charged at 10C rate and discharged at 20C rate, with a capacity loss as little as 0.008% per cycle over more than 1,000 cycles. In addition, the secondary cell can achieve up to 95% state of charge in as little as six minutes.

In one aspect of the invention, a high capacity, high charge rate lithium secondary cell is provide, which includes a high capacity lithium-containing positive electrode in electronic contact with a positive electrode current collector, the current collector in electrical connection with an external circuit, a high capacity negative electrode in electronic contact with a negative electrode current collector, the current collector in electrical connection with an external circuit, a separator positioned between and in ionic contact with the cathode and the anode, and an electrolyte in ionic contact with the positive and negative electrodes, wherein the total area specific impedance for the cell and the relative area specific impedances for the positive and negative electrodes are such that, during charging at greater than or equal to 4C, the negative electrode potential is above the potential of metallic lithium.

In another aspect of the invention, a high capacity, high charge rate lithium secondary cell includes a lithium-containing positive electrode in electronic contact with a positive electrode current collector, the current collector in electrical connection with an external circuit, a negative electrode in electronic contact with a negative electrode current collector, the current collector in electrical connection with an external circuit, a separator positioned between and in ionic contact with the cathode and the anode, and an electrolyte in ionic contact with the positive and negative electrodes, wherein the charge capacity per unit area of the positive and negative electrodes each are at least 0.75 mA-h/cm$^2$, and wherein the total area specific impedance for the cell is less than about 20 $\Omega$-cm$^2$.

In another aspect of the invention, a low fade lithium secondary cell is providing having a lithium-containing positive electrode, the positive electrode in electronic contact with a positive electrode current collector, the current collector in electrical connection with an external circuit, a negative electrode in electronic contact with a negative electrode current collector, the current collector in electrical connection with an external circuit, a separator positioned between and in ionic contact with the cathode and the anode, and an electrolyte in ionic contact with the positive and negative electrodes, wherein the total area specific impedance for the cell and the relative area specific impedances for the positive and negative electrodes are such that the cell is capable of achieving at least about 80% state of charge within about 25 minutes, and wherein the cell is capable of multiple charge/discharge cycles with a capacity loss of less than about 0.2% per cycle.

An aspect of the invention also includes a secondary lithium battery including a positive electrode including a particulate conductive additive and a lithium transition metal phosphate having an olivine structure, the positive electrode having a specific surface area of greater than 10 m$^2$/g and a total pore volume between about 40% and about 60% by volume, the positive electrode forming a layer on a positive electrode current collector having a thickness of about 50 μm to about 125 μm, a negative electrode including a particulate conductive additive and graphitic carbon, the graphitic carbon having an average particle size of less than about 25 μm, the negative electrode having a total pore volume between about 25 and 40% by volume and forming a layer on a negative electrode current collector having a thickness of about 20 μm to about 75 μm, a microporous electronically insulating high rate separator disposed between and in ionic contact with the cathode and the anode, and an electrolyte in ionic contact with the anode and the cathode, wherein the total area specific impedance for the cell and the relative area specific impedances for the positive and negative electrodes are such that, during charging at greater than or equal to 4C, the negative electrode potential is above the potential of metallic lithium.

Another aspect of the invention is a method of charging a lithium secondary cell. The method includes (a) providing a lithium secondary cell including a high capacity lithium-containing positive electrode in electronic contact with a positive electrode current collector, the current collector in electrical connection with an external circuit, a high capacity negative electrode in electronic contact with a negative electrode current collector, the current collector in electrical connection with an external circuit, a separator positioned between and in ionic contact with the cathode and the anode, and an electrolyte in ionic contact with the positive and negative electrodes, wherein the total area specific impedance for the cell and the relative area specific impedances for the positive and negative electrodes are such that, during charging at greater than or equal to 4C, the negative electrode potential is above the potential of metallic lithium, and (b) charging the cell at a C-rate of at least 4C, wherein at least 95% state of charge is obtained in less than 15 minutes.

In one or more embodiments, the area specific impedance of the total cell is localized predominantly at the positive electrode.

In one or more embodiments, the charge capacity per unit area of the positive and negative electrodes each are at least 0.75 mA-h/cm$^2$, or at least 1.0 mA-h/cm$^2$, or at least 1.5 mA-h/cm$^2$.

In one or more embodiments, the total area specific impedance for the cell is less than about 16 $\Omega$-cm$^2$, or less than about 14 $\Omega$-cm$^2$, or less than about 12 $\Omega$-cm$^2$, or less than about 10 $\Omega$-cm$^2$, or less than or equal to about 3.0 $\Omega$-cm$^2$.

In one or more embodiments, the total area specific impedance for the cell is less than about 20 $\Omega$-cm$^2$, and the positive electrode has an area specific impedance $r_1$ and the negative electrode has an area specific impedance $r_2$, and wherein the ratio of $r_1$ to $r_2$ is at least about 10, or the ratio of $r_1$ to $r_2$ is at least about 7, or the ratio of $r_1$ to $r_2$ is at least about 6, or the ratio of $r_1$ to $r_2$ is at least about 5, or the ratio of $r_1$ to $r_2$ is at least about 4, or the ratio of $r_1$ to $r_2$ is at least about 3.

In one or more embodiments, the negative electrode has an area specific impedance, $r_2$, of less than or equal to about 2.5 $\Omega$-cm$^2$, or less than or equal to about 2.0 $\Omega$-cm$^2$, or less than or equal to about 1.5 $\Omega$-cm$^2$.

In one or more embodiments, the positive electrode has a charge and discharge capacity measured at a C-rate of 10C that is greater than 90% of the nominal capacity measured at a C-rate of 1/10C.

In one or more embodiments, the conductivity of the positive electrode does not increase more than a factor of 2 over the state of charge, or a factor of 5 over the state of charge.

In one or more embodiments, the electroactive material of the positive electrode is a lithium transition metal phosphate, and the transition metal of the lithium transition metal phosphate includes one or more of vanadium, chromium, manganese, iron, cobalt and nickel. The lithium transition metal phosphate is of the formula $(Li_{1-x}Z_x)MPO_4$, where M is one or more of vanadium, chromium, manganese, iron, cobalt and nickel, and Z is one or more of titanium, zirconium, niobium, aluminum, or magnesium, and x ranges from about 0.005 to about 0.05, wherein Z is selected from the group consisting of zirconium and niobium.

In one or more embodiments, the position electrode has a specific surface area of greater than about 10 $m^2$/g, or greater than about 15 $m^2$/g, or greater than about 20 $m^2$/g, or greater than about 30 $m^2$/g. The position electrode has pore volume in the range of about 40% to about 70% by volume and a thickness in the range of about 50 μm to about 125 μm.

In one or more embodiments, the negative electrode includes carbon, such as graphitic carbon. The carbon is selected from the group consisting of graphite, spheroidal graphite, mesocarbon microbeads and carbon fibers. The carbon exhibits fast diffusion direction parallel to the long dimension of the particle with a dimension less than 6*(diffusion coefficient of fast direction/diffusion coefficient of $MCMB)^{0.5}$ and a thickness less than about 75 microns and a porosity greater than 25%.

In one or more embodiments, the carbon of the negative electrode has an average particle size of less than about 25 μm, or less than about 15 μm, or less than about 10 μm, or less than about 6 μm. The negative electrode has pore volume in the range of about 20 and 40% by volume, and a thickness in the range of about 20 μm to about 75 μm.

In one or more embodiments, the cell is charged at a C-rate of 10C, wherein at least 90% state of charge to obtain in less than 6 minutes, or the cell is charged at a C-rate of 20C, wherein at least 80% state of charge to obtain in less than 3 minutes. In one or more embodiments, the cell is charged at an overpotential, and the overpotential is a potential near the oxidation potential of the electrolyte.

In one or more embodiments, the cell is capable of achieving at least about 90% state of charge within about 12 minutes, and the cell is capable of multiple charge/discharge cycles with a capacity loss of less than about 0.1% per cycle.

In one or more embodiments, the cell is capable of achieving at least about 95% state of charge within about 6 minutes, and the cell is capable of multiple charge/discharge cycles with a capacity loss of less than about 0.05% per cycle.

As used herein, the electrical resistivity or impedance, e.g., total opposition that a battery offers to the flow of alternating current, is given in units of ohm, charge and discharge capacity in units of ampere hours per kilogram of the storage material (Ah/kg) or milliampere hour per gram of storage material (mAh/g), charge and discharge rate in units of both milliamperes per gram of the storage compound (mA/g), and C rate. When given in units of C rate, the C rate is defined as the inverse of the time, in hours, necessary to utilize the full capacity of the battery measured at a slow rate. A rate of 1C refers to a time of one hour; a rate of 2C refers to a time of half an hour, a rate of C/2 refers to a time of two hours, and so forth. Typically, the C rate is computed from the rate, in mA/g, relative to the capacity of the compound or battery measured at a lower rate of C/5 or less. "State of charge" (SOC) refers to the proportion of the active material still unused according to Faraday's Law. In the case of a battery, it is the proportion of the cell's capacity that is still unused, with respect to its nominal or rated capacity. A fully-charged battery has SOC=1 or 100%, whereas a fully-discharged battery has SOC=0 or 0%. Area specific impedance (ASI) refers to the impedance of a device normalized with respect to surface area and is defined as the impedance measured at 1 kHz (Ω), using an LCZ meter or frequency response analyzer, multiplied by the surface area of opposing electrodes ($cm^2$).

BRIEF DESCRIPTION OF THE DRAWING

A more complete appreciation of the present invention and many of its advantages will be understood by reference to the following detailed description when considered in connection with the following drawings, which are presented for the purpose of illustration only are not intended to limit the scope of the appended claims, and in which:

DETAILED DESCRIPTION OF THE INVENTION

New battery applications demand continuous improvements in battery discharge rate capabilities and a parallel decrease in charge times. However, when a conventional Li-ion battery is charged at a relatively high rate, e.g., greater than 2C, a decrease in the negative electrode potential due to impedance brings the negative electrode below the potential at which lithium plating occurs. This voltage drop may be due to ohmic resistance, concentration polarization, charge transfer resistance, and other sources of impedance.

Figure 1:
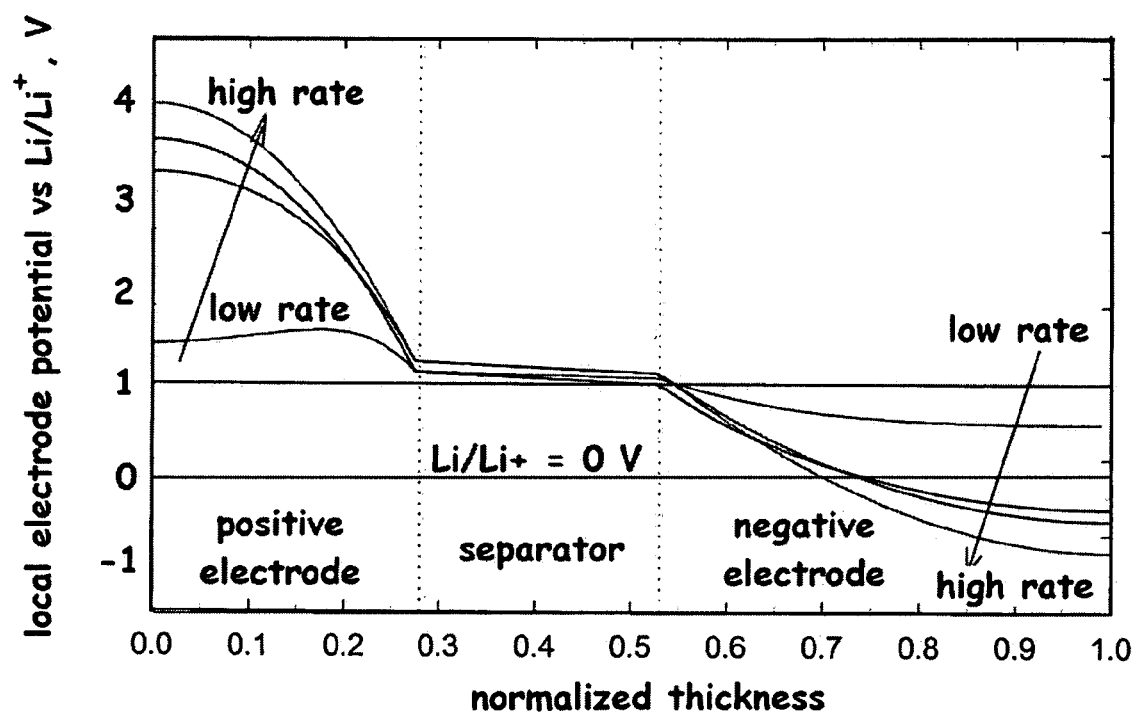
FIG. 1 is a schematic illustration of the local potential (voltage) at various locations across the normalized thickness of the cell during low and high-rate charge cycles in a lithium-ion cell.

This phenomenon is illustrated in FIG. 1, which is a schematic illustration of the local potential (voltage) at various locations across the normalized thickness of a conventional lithium-ion cell. The locations of the positive electrode, separator and negative electrode are indicated. A series of curves indicates the potential for different illustrative charge rates. Arrows in the figure indicate the trend for increasing rate. As the battery is charged at higher rates, the positive electrode potential is pushed to a higher potential and the negative electrode drops to a lower potential. At high rates, the potential at the negative electrode drops to below 0 V vs. Li/Li$^+$ and plating of lithium metal at the negative electrode occurs. Note that the potential of the separator changes little over a wide range of charge rates.

Figure 2:
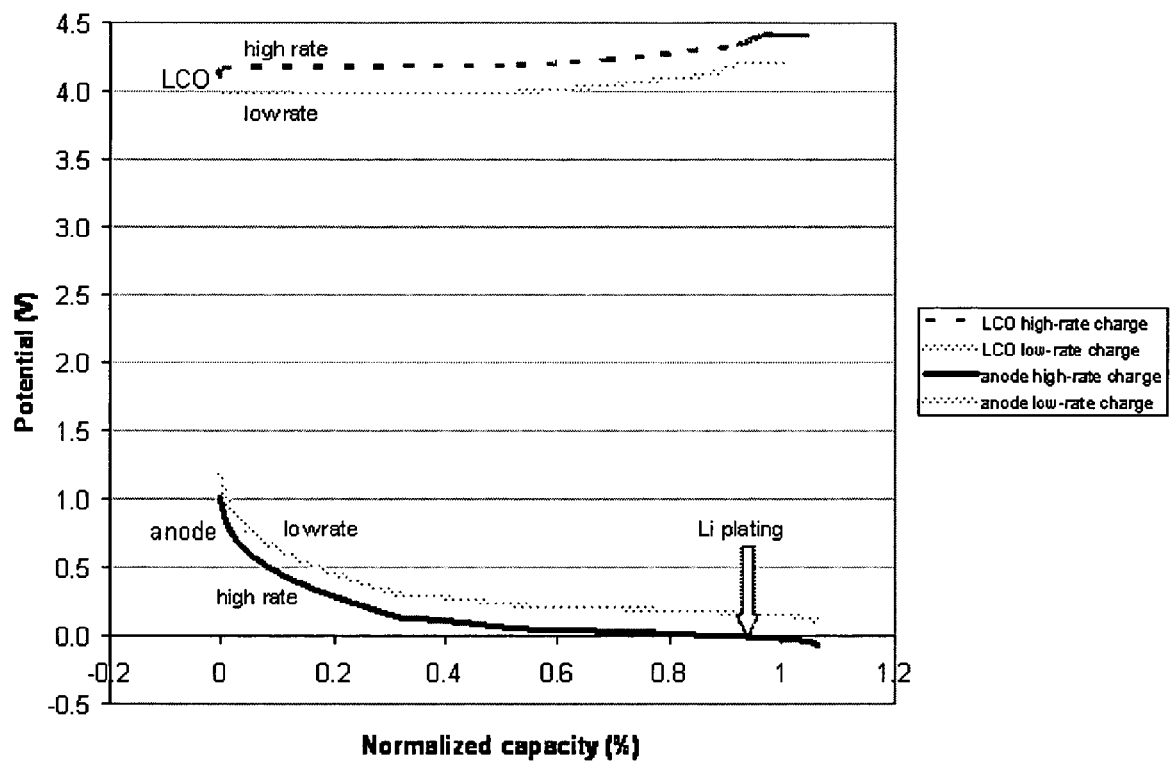
FIG. 2 shows a schematic of the electrode potentials during low and high-rate charge cycles in a $LiCoO_2$-graphite anode cell; note that the anode potential drops below 0 V vs Li/Li+, the lithium plating potential, during high rate charge.

During a high rate-constant current charge, total cell voltage is increased to allow the high charging current to be accommodated. If the cell has high impedance, it must be driven at a higher voltage to achieve the same current flow. FIG. 2 is a schematic illustration of the positive and negative electrode potentials of a conventional LiCoO$_2$ ("LCO")-graphite cell, which has a relatively high impedance (ca. 40 $\Omega$-cm$^2$) over the entire state of charge. At low charge rates, the negative electrode potential remains above the lithium plating potential. During high rate discharge, however, the negative electrode potential is driven so low that the negative potential drops below the lithium plating potential (0 V vs Li/Li$^+$). Lithium plating at the anode takes place under the conditions indicated by the arrow in FIG. 2. Clearly, the high rate-constant current charge of a high-impedance cell results in the undesirable plating of lithium.

Figure 3:
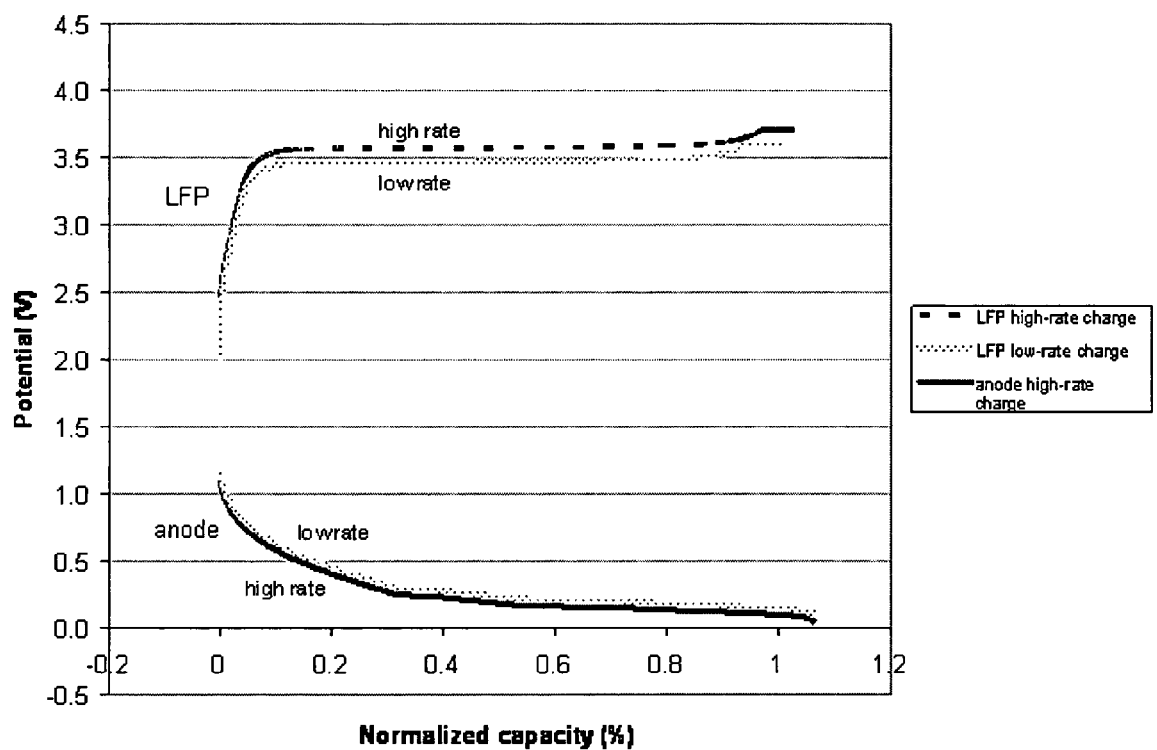
FIG. 3 shows a schematic of the electrode potentials during low and high-rate charge cycles in a $LiFePO_4$-graphite anode cell; note that the anode potential does not drop below 0 V vs Li/Li+, the lithium plating potential, during the charging cycle.

The advantages of the present invention are illustrated by the low impedance Li-ion cell of FIG. 3. In the case of a low-impedance cell according to one or more embodiments of the present invention, the negative electrode does not plate lithium. FIG. 3 shows the positive and negative electrode potentials for a LiFePO$_4$ ("LFP")-graphite cell with an exemplary total area specific impedance (ASI$_{tot}$) of about 12 $\Omega$-cm$^2$. During the entire high rate-constant current charging of the LiFePO$_4$-graphite cell, the potential at the negative anode remains above the potential of lithium metal The positive and negative electrodes represent the greatest contribution to the total area specific impedance (ASI$_{tot}$) of the cell. The impedance of the separator, and the various connecting metal parts of the cell such as the tabs, the current collector foils or grids and the electrode-current collector interfacial resistance generally contribute between about 10–20%, and typically about 15%, of the total area specific impedance (ASI$_{tot}$).

According to one or more embodiments, the impedance of the negative electrode is at a minimum. In a typical Li-ion cell according to one or more embodiment, the area specific impedance of the negative electrode (ASI$_a$) is less than about 3.0 $\Omega$-cm$^2$, or less than about 2.5 $\Omega$-cm$^2$, or less than 2.0 $\Omega$-cm$^2$, or less than 1.8 $\Omega$-cm$^2$, or less than 1.5 $\Omega$-cm$^2$.

A further feature of a high rate, low impedance Li-ion cell is that the positive electrode bears a predominant amount or even a major amount of the total cell impedance (ASI$_{tot}$). In one or more embodiments, up to 70% of the cell impedance is localized at the positive electrode. In particular, the ratio of area specific impedance of the positive electrode (ASI$_c$) to the area specific impedance of the negative electrode (ASI$_a$) is greater than about three. In other embodiments, the ratio of area specific impedance of the positive electrode (ASI$_c$) to the area specific impedance of the negative electrode (ASI$_a$) is in a range of about 3–10, or is greater than about 4, greater than about 5, greater than about 6, greater than about 7, greater than about 8, greater than about 9, or greater than about 10.

The total area specific impedance of the cell (ASI$_{tot}$) is less than 20 $\Omega$-cm$^2$. The total area specific impedance (ASI$_{tot}$) can be less than 18 $\Omega$-cm$^2$, or less than 16 $\Omega$-cm$^2$, or less than 14 $\Omega$-cm$^2$, or less than 12 $\Omega$-cm$^2$, or less than 10 $\Omega$-cm$^2$ or less than 8 $\Omega$-cm$^2$. The smaller the value for the total area specific impedance (ASI$_{tot}$), the smaller the proportion of the total impedance required to be borne at the positive electrode in order to prevent lithium plating. Table 1 lists an exemplary relationship between total area specific impedance (ASI$_{tot}$) and the area specific impedance at the positive electrode (ASI$_c$) for an exemplary Li-ion cell according to one or more embodiments of the present invention.

TABLE 1

| ASI$_{tot}$($\Omega$-cm$^2$) | 8 | 10 | 12 | 14 | 16 | 18 | 20 |
|---|---|---|---|---|---|---|---|
| ASI$_c$/ASI$_a$ | 3 | 4 | 5 | 6 | 7 | 9 | 10 |

Surprisingly, Li-ion cells according to one or more embodiments of the present invention achieve high charge rates in cells having thick electrode layers, e.g., a positive electrode layer of about 50 μm to about 125 μm on one side of the current collector. While thicker electrode layers provide higher charge capacity, the thicker layers also typically increase the impedance of the electrodes (by, for example, increasing the distance and the tortuosity of the lithium diffusion pathway). In a single cell consisting of a positive and negative electrode in ionic contact with one another through the electrolyte, the areal charge capacity is one-half of the measured areal capacity for the double-sided electrode, e.g., at least 0.75 mA-hr/cm$^2$. It has been surprisingly discovered that a Li-ion cell having areal charge capacities of at least 0.75 mA-hr/cm$^2$, or 1.0 mA-h/cm$^2$ or 1.5 mA-hr/cm$^2$ are capable of high rate charge and discharge without plating lithium at the negative electrode.

A prior art method of obtaining a high charge and discharge rates is to reduce the areal capacity of the cell, e.g., by using very thin electrodes. A very thin electrode (i.e., with a low areal capacity) could achieve high charge and discharge capacity at high rates; however, the low mass/volume of the electrode in the cell would not result in a practical device. The cell according to one or more embodiments of the present invention provides both high rate capability AND high charge capacity.

In one or more embodiments of the present invention, a high capacity Li-ion cell is charged and discharged at a high rate, e.g., greater than 2C, greater than 4C, or greater than 10C, or even at 20C, without significant capacity fade. The cell can be initially charged by the galvanostatic (constant current) method to target voltage, e.g., 3.6–3.8 V for a LiFePO$_4$—C cell, using a high C-rate (2, 5, 10, and 20C.) After the target voltage is reached, a potentiostatic segment can be applied until the current decreases to a C/20 rate (CC-CV protocol or taper charge method), which is considered to be 'fully charged' or state of charge. The time to achieve state of charge is very fast, e.g., less than 15 minutes, with low levels of cell heating. This can be compared to a low charge rate of 1C, requiring 60 minutes for state of charge.

The inventors have found that the batteries made according to the present invention show surprisingly low fade rate when charged at a high rate. For batteries charged at 10C, high capacity lithium-ion cells show less than 0.2% loss per cycle, 0.1% loss per cycle, 0.05% loss per cycle, and 0.025% loss per cycle.

In one or more embodiments, the Li-ion cell charges at 4C-rate and reaches 90%, or even 95%, state of charge within 15 minutes. Other Li-ion cells charge at 10C-rate and achieve 80%, or even 90%, state of charge within 6 minutes. The Li-ion cells also possess superior discharge rate capabilities as compared to conventional Li-ion cells. Li-ion cells according to one or more embodiments of the present invention demonstrate 10C capacity of greater than 70%, or 80%, or 90%, or even 95% of nominal capacity measured at C/10.

In another embodiment of the present invention, the lithium-ion battery can be charged to potentials well above the standard charging potential, in order to charge the battery more quickly. In a conventional 4.2V lithium-ion battery, such as one that contains $LiCoO_2$, the maximum charging current is also limited by the potential at the positive electrode. A high potential at the positive electrode will cause electrolyte oxidation, which greatly decreases the lifetime of the battery. Lithium iron phosphate has a lower average voltage during charge. Thus, a positive electrode incorporating lithium iron phosphate as the active material can be polarized to a greater extent before reaching the electrolyte oxidation potential.

In a preferred embodiment of the present invention, transition metal phosphate positive electrode materials are charged using an overpotential because there is no instability in the delithiated state. As a result, there is no excess lithium. In contrast, conventional positive electrode materials, using $LiCoO_2$ for example, cannot be charged to potentials greater than 4.2V because of its instability in the delithiated state. The larger overpotential at the positive electrode, i.e., the potential above the standard charging potential, allows the cell to be charged at a high, constant current for a longer period of time before the charging current must be decreased or before the cell is placed on a potentiostatic, or constant voltage, hold. Thus, the cell can be charged more quickly without danger of electrolyte oxidation. The lower average voltage of the positive electrode material is particularly useful when combined with a low-impedance negative electrode (or a higher positive electrode-to-negative electrode impedance ratio ($ASI_c/ASI_a$)), as described in herein. Note that a high impedance negative electrode would not be useful because lithium would plate onto the anode regardless of the positive electrode potential.

Typically, the rate capability of a cell is determined by a constant current or constant power continuous discharge, which gives rise to a Ragone plot. In one embodiment of this invention, the discharge energy density of the battery is 85 Wh/kg at a power density of 750 W/kg. Ragone plots are used to describe energy density during discharge, not charge. So other methods are used to describe the high charge capability of this invention.

According to one or more embodiments, a Li-ion cell is provided for which the resistance of the components contributing to the voltage drop at the negative electrode are minimized. Factors affecting the impedance (and hence rate capability) at the negative electrode itself during high-rate discharge include electrode thickness, bulk electronic conductivity, contact resistance between current collector and active material particles, average size of active material—typically carbon—particles, $Li^+$ diffusion coefficient in the active material, electrode porosity, pore size distribution and tortuosity, ionic conductivity of the liquid electrolyte, and transference number of $Li^+$ in the liquid electrolyte. The factors listed above that strongly affect the negative electrode's rate capability are equally important in the case of the positive electrode as well.

A Li-ion battery capable of safe and long-term operation at a high rate of charge and discharge without a significant loss of power and capacity and a method of its manufacture according to the present invention is described in detail. The positive and negative electrodes are designed at the (1) active particle level, (2) electrode level, and (3) cell level to maximize rate, reduce impedance, in particular at the negative electrode, while maintaining a high charge capacity.

Figure 4:
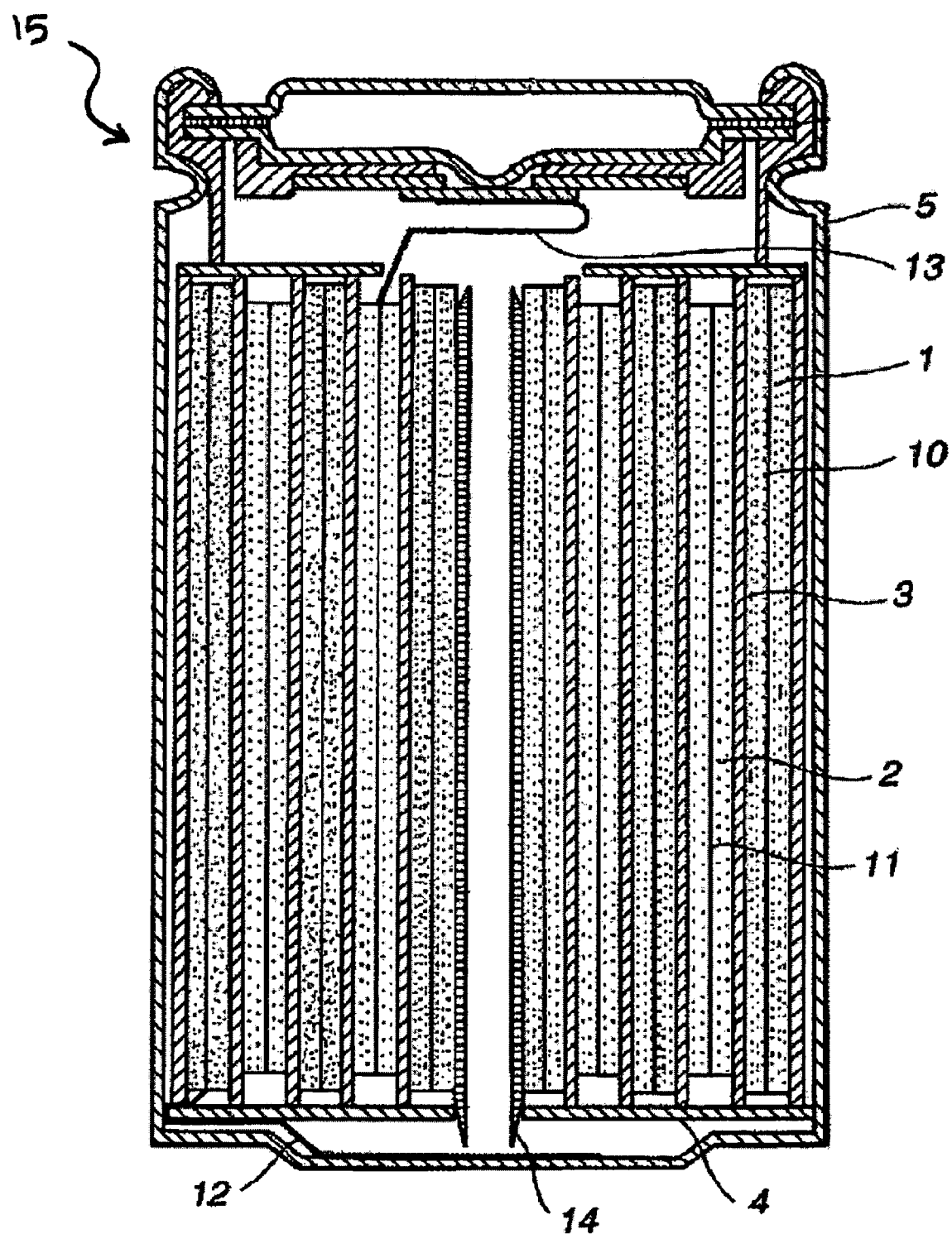
FIG. 4 is a cross-sectional view showing an exemplary lithium secondary cell having spirally wound electrodes.

The nonaqueous electrolyte secondary battery includes a battery element having an elongated cathode and an elongated anode, which are separated by two layers of an elongated microporous separator which are tightly wound together and placed in a battery can. A typical spiral electrode secondary cell is shown in FIG. 4 (reproduced from U.S. Pat. No. 6,277,522). The secondary cell 15 includes a double layer of anode material 1 coated onto both sides of an anode collector 10, a separator 2 and a double layer of cathode material 3 coated onto both sides of cathode collector 11 that have been stacked in this order and wound to make a spiral form. The spirally wound cell is inserted into a battery can 5 and insulating plates 4 are disposed at upper and lower surfaces of the spirally wound cell. A cathode lead 13 from anode collector 11 provides electrical contact with cover 7. An anode lead 12 is connected to the battery can 5. An electrolytic solution is added to the can.

A Li-ion battery capable of safe, long-term operation at a high rate of charge and discharge and a method of its manufacture includes one or more of the following features.

At the material level, the positive electrode includes a lithium-transition metal-phosphate compound as the electroactive material. The lithium-transition metal-phosphate compound may be optionally doped with a metal, metalloid, or halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material is a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05. In a typical battery, the electroactive material is $(Li_{1-x}Z_x)MPO_4$, where Z is Zr or Ti.

Doped lithium iron phosphate compounds may be prepared from starting materials of lithium salts, iron compounds and phosphorous salts including, but not limited to, lithium carbonate, ammonium phosphate and iron oxalate, to which a low additional concentration of dopant metal such as Mg, Al, Ti, Fe, Mn, Zr, Nb, Ta and W have been added, typically as a metal oxide or metal alkoxide. The powder mixture is heated under a low oxygen environment at a temperature of 300° C. to 900° C. These compounds exhibit increased electronic conductivity at and near room temperature, which is particularly advantageous for their use as lithium storage materials. Further details regarding the composition and preparation of these compounds are found in United States Published Application 2004/0005265, which is incorporated herein in its entirety by reference.

The transition-metal doped $LiFeO_4$ has a markedly smaller particle size and much larger specific surface area than previously known positive active materials, such as $LiCoO_2$, $LiNiO_2$ or $LiMn_2O_4$ and, thus improved transport properties. In some embodiments the positive active material consists of powder or particulates with a specific surface area of greater than 10 $m^2/g$, or greater than 15 $m_2/g$, or greater than 20 $m^2/g$, or even greater than 30 $m^2/g$. While methods are known to produce these traditional positive active materials in the form of high specific surface area powders, Li-ion battery batteries made from such materials have inferior safety and stability characteristics due to a combination of the high oxidation potential and low inherent thermal stability of these conventional materials in their partially or fully delithiated form, such as that existing in a partially or fully charged Li-ion battery.

The present inventors have unexpectedly discovered that $LiFeO_4$ having the olivine structure and made in the form of very small, high specific surface area particles are exceptionally stable in their delithiated form even at elevated temperatures and in the presence of oxidizable organic solvents, e.g., electrolytes, thus enabling a safer Li-ion battery having a very high charge and discharge rate capability. The inventors have also found that the small-particle-size, high specific-surface-area $LiFePO_4$ material exhibits not only high thermal stability, low reactivity and high charge and discharge rate capability, but it also exhibits excellent retention of its lithium intercalation and deintercalation capacity during many hundreds, or even thousands, of high-rate cycles.

On an electrode level, the active material and a conductive additive are combined to provide an electrode layer that permits rapid lithium diffusion throughout the layer. A conductive additive such as carbon or a metallic phase is included in order to improve its electrochemical stability, reversible storage capacity, or rate capability. Exemplary conductive additives include carbon black, acetylene black, vapor grown fiber carbon ("VGCF") and fullerenic carbon nanotubes. Conductive diluents are present in a range of about 1%–5% by weight of the total solid composition of the positive electrode.

The positive electrode (cathode) is manufactured by applying a semi-liquid paste containing the cathode active compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density. The binder used in the electrode may be any suitable binder used as binders for non-aqueous electrolyte cells. Exemplary materials include a polyvinylidene fluoride (PVDF)-based polymers, such as poly (vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

The positive electrode containing the positive electroactive material has a specific surface area of the electrode measured using the nitrogen adsorption Brunauer-Emmett-Teller (BET) method after the densification or calendaring step that is greater than 10 $m^2/g$ or greater than 20 $m^2/g$. A positive electrode can have a thickness of less than 125 μm, e.g., between about 50 μm to 125 μm, or between about 80 μm to 100 μm on each side of the current collector, and a pore volume fraction between about 40 and 70 vol. %. The active material is typically loaded at about 10–20 $mg/cm^2$, and typically about 11–15 $mg/cm^2$. In general, a thicker electrode layer (and higher active material loading) provides greater total capacity for the battery. However, thicker layers also increase the electrode impedance. The present inventors have surprisingly discovered that high capacity, thick layers may be used in a low impedance (high rate) cell. Use of a high specific surface area active material, while maintaining adequate pore volume, provides the desired capacity without increasing impedance to unacceptably high levels.

In another embodiment of the present invention, the electroactive material of the positive electrode includes a material that, while of high electronic conductivity, does not vary its conductivity by more than a factor of five, or factor of two, over the entire charge cycle. This feature of the Li-ion cell is contrasted with conventional electroactive positive electrode materials such as $LiCoO_2$, $LiNiO_2$ or $LiMn_2O_4$ for which conductivity increases dramatically once delithiation during charging occurs. The dramatic increase in conductivity of the electroactive material of the positive electrode contributes to a decrease in impedance. In contrast, an electroactive material of the present cells exhibit only moderate increases in conductivity, so that its contribution to impedance is more moderate.

The selection criteria for an anode are at two levels, the particle level and the electrode level. At the particle level, the particle size and the Li diffusion coefficient of the particle are selection criteria. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 μm, or smaller than about 15 μm, or smaller than about 10 μm, or even less than or equal to about 6 μm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of MCMB is ~10e-10 $cm^2/s$. Artificial graphite has a diffusion coefficient of ~10e-8 $cm^2/s$. As a result larger particle size artificial graphite could be used, approximately equal to 15 microns times the square root of the ratio of the respective diffusivities (H. Yang et al., *Journal of Electrochemical Society*, 151 (8) A1247–A1250 (2004)).

In some embodiments, the negative active material consists of powder or particulates with a specific surface area measured using the nitrogen adsorption Brunauer-Emmett-Teller (BET) method to be greater than about 2 $m^2/g$, or 4 $m^2/g$, or even about 6 $m^2/g$.

On an electrode level, the active material and a conductive additive are combined to provide an electrode layer that permits rapid lithium diffusion throughout the layer. A conductive additive such as carbon or a metallic phase may also be included in the negative electrode. Exemplary conductive additives include carbon black, acetylene black, vapor grown fiber carbon ("VGCF") and fullerenic carbon nanotubes. Conductive diluents are present in a range of about 0%–5% by weight of the total solid composition of the negative electrode.

The negative electrode (anode) of the battery is manufactured by preparing a paste containing the negative active material, such as graphitic or non-graphitic carbon, and a conductive carbon additive homogeneously suspended in a solution of a polymer binder in a suitable casting solvent. The paste is applied as a uniform-thickness layer to a current collector and the casting solvent is removed by drying. A metallic substrate such as copper foil or grid is used as the negative current collector. To improve the adhesion of the active material to the collector, an adhesion promoter, e.g., oxalic acid, may be added to the slurry before casting. The binder used in the negative electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

At the electrode level, the negative electrode can have a thickness of less than 75 µm, e.g., between about 20 µm to 65 µm, or between about 40 µm to 55 µm on both sides of the current collector, and a pore volume fraction between about 20 and 40 vol. %. The active material is typically loaded at about 5–20 mg/cm$^2$, or about 4–5 mg/cm$^2$. In general, a thicker electrode layer (and higher active material loading) provides greater total capacity for the battery. However, thicker layers also increase the electrode impedance by reducing the ease of lithium diffusion into the anode. The present inventors have surprisingly discovered that high capacity, thick layers may be used in a low impedance cell through selection of active materials as indicated above and maintaining adequate pore volume.

A nonaqueous electrolyte is used and includes an appropriate lithium salt dissolved in a nonaqueous solvent. The electrolyte may be infused into a porous separator that spaces apart the positive and negative electrodes. In one or more embodiments, a microporous electronically insulating separator is used.

Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-BL, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

A solid or gel electrolyte may also be employed. The electrolyte may be an inorganic solid electrolyte, e.g., LiN or LiI, or a high molecular weight solid electrolyte, such as a gel, provided that the materials exhibits lithium conductivity. Exemplary high molecular weight compounds include poly(ethylene oxide), poly(methacrylate)ester based compounds, or an acrylate-based polymer, and the like.

As the lithium salt, at least one compound from among $LiClO_4$, $LiPF_6$, $LiBF_4$, $LiSO_3CF_3$, $LiN(SO_2CF_3)_2$, $LiN(SO_2CF_2CF_3)_2$ and the like are used. The lithium salt is at a concentration from 0.5 to 1.5 M, or about 1.3 M.

The above described positive electrode is brought into intimate contact with the negative electrode through the separator layers, which are then spirally wound a number of times around a small-diameter mandrel to form the jelly-roll electrode-separator assembly. Next, the jelly-roll structure is inserted into a nickel-plated steel battery can, current collector tabs are spot-welded to the battery can and can header, which is preferably equipped with a variety of safety features, such as positive-temperature coefficient elements, pressure burst disks, etc. Alternatively, uncoated regions can be created along the edge of the electrode, thereby exposing bare metal foil. One or preferably more metal foil strips or tabs, between 0.4 and 0.8 cm wide, can be attached to these bare regions using an ultrasonic welder. These tabs can then be attached to the can or header using an ultrasonic or spot (resistance) welder. The nonaqueous electrolyte including a solution of a lithium salt in a mixture of carbonate esters is injected into the battery can, the can header is sealed to the battery can using a crimp seal or laser weld.

According to one or more embodiments, a Li-ion battery contains an optionally doped lithium transition metal phosphate positive electrode, a highly microporous electronically insulating separator layer, a graphitized-carbon negative electrode, and a multicomponent liquid organic electrolyte solution in which a lithium salt is dissolved at a concentration from 0.5 to 1.5 M. Both the positive and negative electrodes have high surface area and high pore volume. In order to reduce the chance of lithium plating at the anode, the lithium capacity of the negative electrode is higher than that of the positive electrode. The battery is capable of being charged and discharged at a very high rate, due to having the above described relative electrode resistances, which is accomplished by the selection of appropriate active materials, e.g., composition, particle size, porosity, surface area, pore volume, etc., and by the addition of appropriate amounts of conductive diluents such as carbon to the positive or negative electrode. The types, amounts, and methods of adding such conductive diluents are readily determined by methods well-known to those skilled in the art.

Although the particular embodiment of a Li-ion battery described here relates to a cylindrical cell, it is to be understood that the present invention is not limited to such a battery shape. In fact, other can shapes and sizes, such as square, rectangular (prismatic) coin, button or the like may be used.

Further, although the above description uses an example of a liquid type nonaqueous electrolyte Li-ion battery, it is to be understood that other types of non-aqueous electrolytes, such as those of gel or solid polymer type can be used to manufacture thin batteries of this invention, whose electrodes may be bonded to their respective separators and packaged in thin metal-polymer laminate film bags as an outer casing material.

EXAMPLES

Example 1

Preparation of a Lithium-ion Secondary Cell

To prepare doped $LiFePO_4$, iron oxalate, lithium carbonate, ammonium dihydrogen phosphate and zirconium ethoxide are mixed in a 2:1:2:0.02 molar ratio in a plastic milling jar containing grinding media and acetone for 72 hours. Heating and stirring the slurry to the boiling point of acetone remove the acetone. The dried powder is heated under an inert atmosphere at 1° C. per minute to 350° C. and held there for 10 hours, followed by ramping at 5 degrees per minute to 600° C. and holding there for 20 hours. The finished product is milled and then stored in the absence of water.

The positive electrode slurry is prepared by dissolving 7 g of PVDF-HFP copolymer commercially available as Kynar® 2801 from AtoFina in 250 g of NMP and dispersing in the resulting solution a dry mixture of 88 g of doped $LiFeO_4$ prepared as described above and 5 g of conductive carbon (Super P or Ensaco). The paste is homogenized in a planetary mixer or blender, cast on both sides of an aluminum foil current collector using a die casting apparatus, dried in an oven to remove the casting solvent and densified using a calendering apparatus. The electrode mass thus prepared was carefully scraped from the current collector foil and its porosity determined to be 53–57 vol.-%. Its specific surface area determined by the BET method was 22–25 $m^2/g$. The two-sided thickness of the calendered positive electrode, including current collector foil, was approximately 200 µm. The positive electrode had an areal capacity of approximately 1.6 $mAh/cm^2$.

The negative electrode was prepared by dissolving 8 g of PVDF-HFP copolymer described above in 250 ml of NMP, adding to it a mixture of 88 g of mesophase microbead synthetic graphitic carbon MCMB 6-28 (Osaka Gas Co., Ltd.) and 4 g of conductive carbon (Super P). The paste was homogenized in a planetary mixer or blender, cast on both sides of a copper current collector foil using a die casting apparatus, dried in an oven and densified using a calendering apparatus. The negative electrode porosity was determined to be 29–33 vol.-%. The two-sided thickness of the calendered negative electrode, including current collector foil, was approximately 90 µm. The negative electrode had an areal capacity of approximately 1.7 $mAh/cm^2$.

Both electrodes were cut to proper dimensions, interposed with a slightly larger elongated pieces of a microporous polyolefin separator Celgard® 2500 (Celgard LLC), assembled into an 18650-size cylindrical cell by a method well-understood by those schooled in the art and activated with a 1.3 M solution of $LiPF_6$ in a mixture of cyclic and acyclic carbonate esters.

Total Cell Areal Specific Impedance Measurement.

Area specific impedance (ASI) is the impedance of a device normalized with respect to surface area and is defined as the impedance measured at 1 kHz ($\Omega$), using an LCZ meter or frequency response analyzer, multiplied by the surface area of opposing electrodes ($cm^2$). This measurement was performed by applying a small (5 mV) sinusoidal voltage to the cell and measuring the resulting current response. The resulting response can be described by in-phase and out-of-phase components. The in-phase (real or resistive) component of the impedance at 1 kHz is then multiplied by the surface area of opposing electrodes ($cm^2$) to give the area specific impedance. The area specific impedance of the cell from Example 1 was 15 $\Omega$-$cm^2$.

Example 2

Preparation of a Li-Ion Cell

A positive electrode was prepared as described in Example 1, the only exception being that acetone was used instead of NMP as a casting solvent to prepare a positive electrode paste. A cylindrical Li-ion battery was assembled exactly following the steps and procedures described in Example 1. The positive electrode material removed from the current collector foil after calendering had a porosity of 27 vol.-% and specific surface area of 13 $m^2/g$.

Example 3

Preparation of a Li-Ion Cell

A positive electrode was prepared as described in Example 1, the only exception being that an acetone-NMP mixture in the volumetric ratio of 90 to 1 was used instead of pure NMP as a casting solvent to prepare a positive electrode paste. A cylindrical Li-ion battery was assembled exactly following the steps and procedures described in Example 1.

Example 4

Preparation of a Li-Ion Cell

A negative carbon-based electrode was prepared following the procedure described in Example 1, the only exception being that a larger-particle-size mesophase microbead graphitic-type carbon, MCMB 10-28 (Osaka Gas Co., Ltd.) was used instead of MCMB 6-28. A cylindrical Li-ion battery was then assembled exactly following the steps and procedures described in Example 1.

Example 5

Negative Electrode Area Specific Impedance Measurement

Pouch-type test cells were assembled using rectangular electrode pieces punched out of the positive and negative electrodes described in Example 1, with the following exceptions: (1) an acetone-NMP mixture in the volumetric ratio of 90 to 10 was used, instead of pure NMP as a casting solvent to prepare a positive electrode paste; (2) Celgard E903, rather than Celgard 2500, microporous separator was used; and (3) 1.0 M solution of LiPF6 in a mixture of cyclic and acyclic carbonate esters was used as the electrolyte.

After the electrodes were punched to the correct size and shape, a portion of each electrode was removed to reveal bare metal foil. This bare metal foil region was approximately two inches long and 0.5 inches wide and served as a tab for current collection. A piece of separator was placed between the two electrodes. Then, another small piece of separator was used to electrically insulate a small piece of lithium placed on the edge of a strip of copper foil. This lithium reference electrode was placed between the two previously mentioned electrodes, near the outside edge. The entire assembly was then placed in a thin, metal-polymer laminate film sealed on three sides to create a pouch or bag as an outer casing material. Sufficient electrolyte was added to fully wet the separator and the bag was sealed across the bare metal foil tabs, using an impulse sealer. The pouch cell was placed between two rigid plates, which were then clamped together using binder clips.

The area specific impedance of each electrode was measured independently, according to the method described in Example 1. In the case of a three electrode cell, the contribution of the anode and cathode impedance to the overall cell impedance can be separated. Measurement of the reference electrode cell showed that the negative electrode area specific impedance was less than 2 $\Omega$-$cm^2$.

Example 6

Charge/Discharge Cycling of Li-ion Cell at Different C-Rates

A reference electrode pouch cell was fabricated following the procedure described in Example 5.

Figure 5:
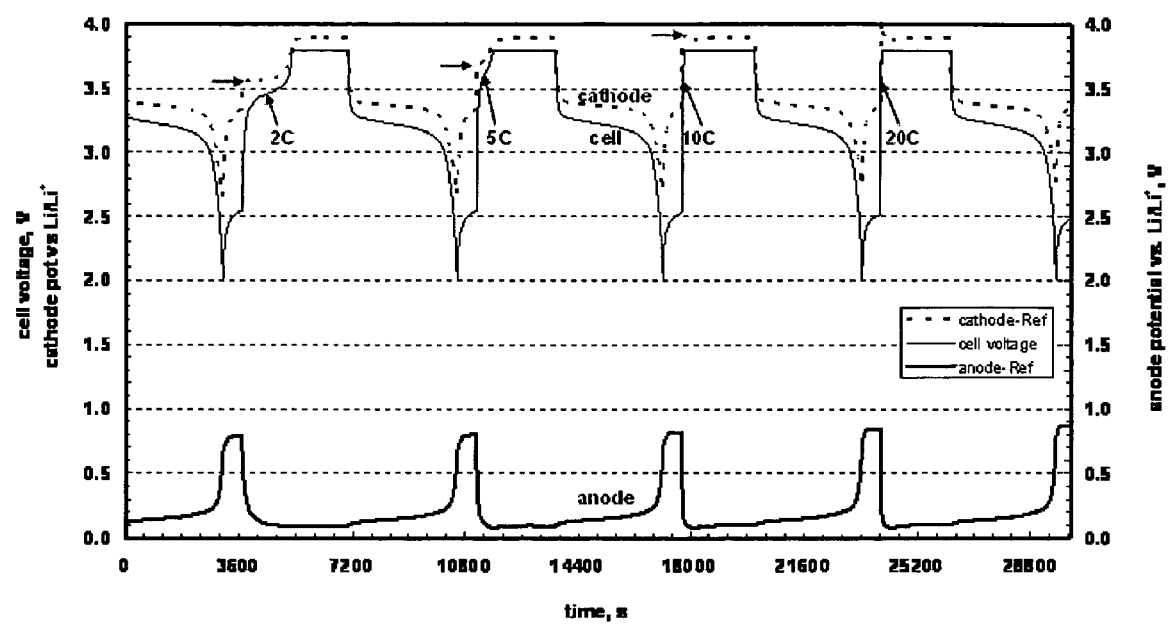
FIG. 5 illustrates voltage profile curves in a reference electrode during charge at 2C, 5C, 10C and 20C for a lithium ion test cell constructed according to one or more embodiments of the present invention.

The cell was initially charged by the galvanostatic (constant current) method to 3.8 V using progressively higher C-rates (2, 5, 10, and 20C.) After each charge, a potentiostatic segment was applied until the current decreased to a C/20 rate (CC-CV protocol or taper charge method). The potentials of the positive and negative electrodes were recorded independently using the lithium reference electrode, which are shown in FIG. 5. In FIG. 5, the positive electrode (cathode) potential is represented by a dashed line at the top of the figure and the negative electrode (anode) potential is represented by a heavy line in the lower portion of the figure. The potential of the anode remains above 0 V (the plating potential of lithium metal) even at charge rates of 20 C. The charging cycle at 10C and 20C is extremely fast. State of charge is achieved at very short charge durations, e.g., about 6 minutes at 10C, with low levels of cell heating. This can be compared to a low charge rate of 1C, requiring 60 minutes for state of charge.

The figure demonstrates that the cell can be charged at rates up to 20 C without plating of lithium at the negative electrode. The positive electrode polarization (as indicated by the horizontal arrows in the figure) is much larger than the negative electrode polarization, indicating that a majority of the impedance in the system occurs at the positive electrode, thus preventing the negative electrode from reaching the lithium plating potential.

Example 7

Cycle Life of a Li-ion Cell at 10C

An 18650-type cylindrical cell was assembled using positive and negative electrodes as described in Example 1, with the only exception being that an acetone-NMP mixture in the volumetric ratio of 90 to 10 was used, instead of pure NMP as a casting solvent, to prepare a positive electrode paste. The 18650 cylindrical Li-ion battery was assembled exactly following the steps and procedures described in Example 1.

Figure 6:
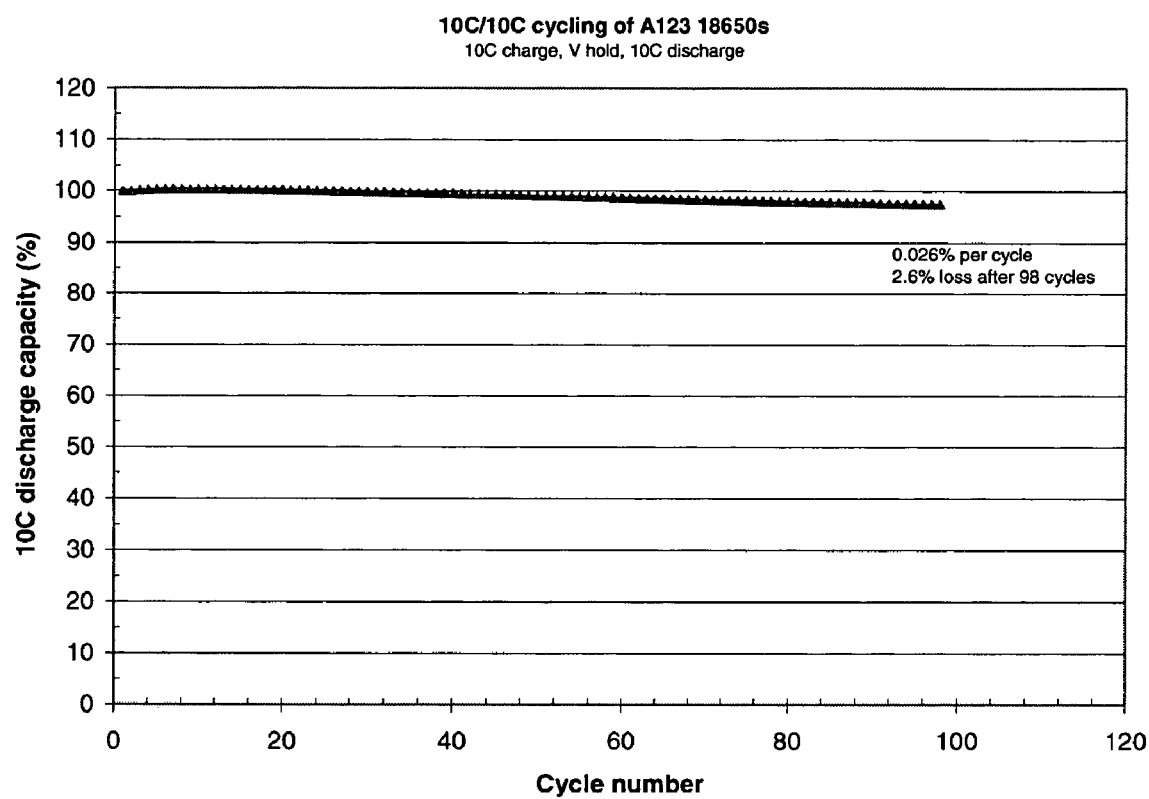
FIG. 6 shows the charge and discharge voltage and capacity of a test cell constructed according to one or more embodiments of the present invention during extended cycling at a 10C charge and 10C discharge rate.
Figure 7:
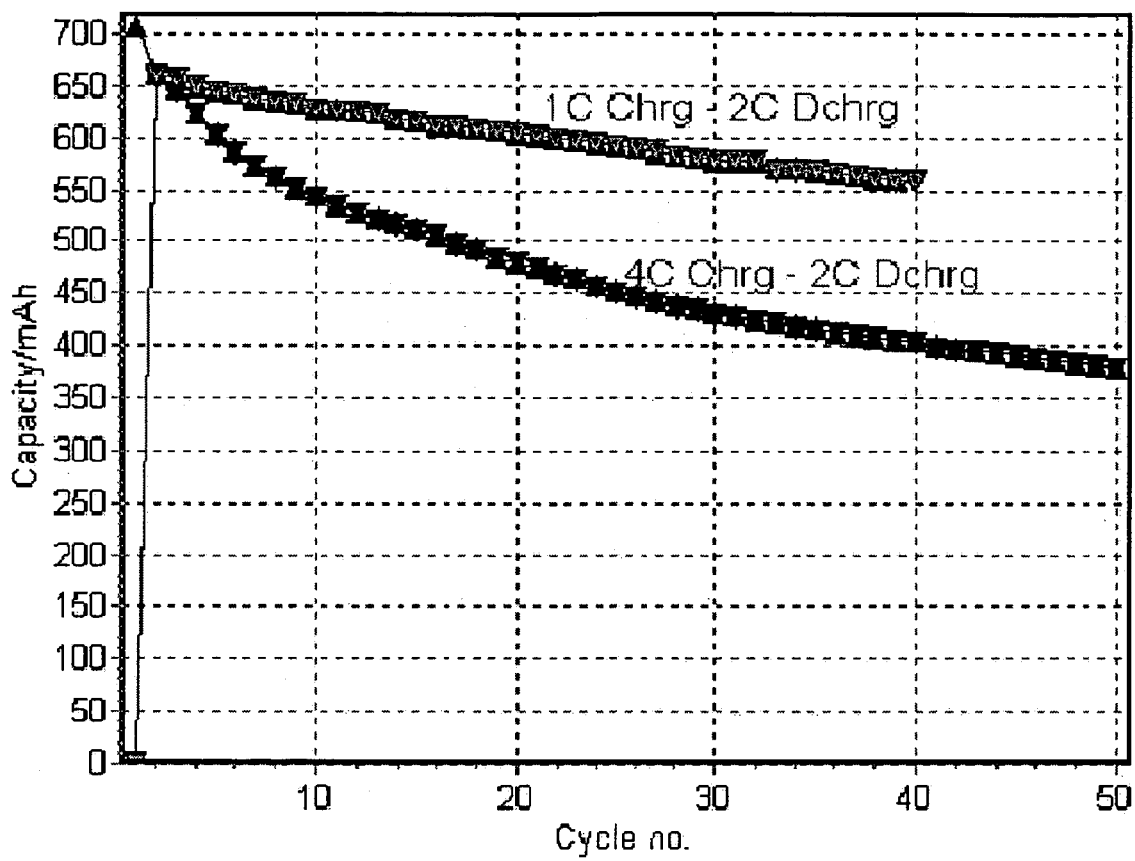
FIG. 7 is a plot of capacity vs. cycle number at different charge/discharge rates for a commercially available comparative lithium-ion battery.

The cell was charged by the galvanostatic (constant current) method to 3.8 V at a 10C rate and followed by a potentiostatic segment until the current decreased to a C/20 rate (CC-CV protocol or taper charge method). The cell was then discharged at 10C, allowed to rest for 30 minutes, then charged again. The data was normalized to the 10C capacity during the first discharge. FIG. 6 is a plot of discharge capacity vs. cycle number for the cell, demonstrating only a 2.6% capacity loss over 98 cycles. This represents a capacity fade of only 0.026% per cycle.

Comparative Example 1

For comparison purposes, a number of contemporary commercial Li-ion cells made by several leading manufacturers were recovered from their multi-cell battery packs and subjected to several slow (C/5) charge-discharge cycles between 4.2 and 2.8 V followed by a series of single discharges at discharge rates from C/2 to 4C. The best performing cell type (an 800 mAh prismatic cell based on the $LiCoO_2$-graphite couple which showed very low capacity fade during slow cycling and the highest rate capability (84% capacity retention at a 4C rate)) was selected for further comparative testing.

The cell was cycled at a 1C rate of charge and a 2C rate of discharge between 2.8 and 4.2 V. The cell capacity (measured in units of mA-h) decreased from approximately 660 mA-h to 560 mA-h over 40 cycles, which represents a total decrease in capacity of 15.2% total and a loss in capacity of 0.38% per cycle. A similar cell that was cycled at a 4C charge rate and a 2C discharge rate exhibited even poorer capacity fade performance. After 50 cycles, the cell exhibited a 42.4% loss of capacity, representing 0.85% capacity loss per cycle. Life cycle performance of these comparative lithium-ion cells is shown in FIG. 8.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. Accordingly, those skilled in the art would recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

What is claimed is:

1. A method of charging a lithium secondary cell, comprising:

(a) providing a lithium secondary cell, comprising:
a lithium-containing positive electrode in electronic contact with a positive electrode current collector, said current collector in electrical connection with an external circuit;
a negative electrode in electronic contact with a negative electrode current collector, said current collector in electrical connection with an external circuit;
a separator positioned between and in ionic contact with the cathode and the anode; and
an electrolyte in ionic contact with the positive and negative electrodes,
wherein the charge capacity per unit area of the positive and negative electrodes each are at least 0.75 mA-h/$cm^2$; and
wherein the total area specific impedance for the cell and the relative area specific impedances for the positive and negative electrodes are such that, during charging at greater than or equal to 4C, the negative electrode potential is above the potential of metallic lithium; and (b) charging the cell at a C-rate of at least 4C, wherein at least 95% state of charge is obtained in less than 15 minutes.

2. The method of claim 1, comprising charging the cell at a C-rate of 10C, wherein at least 90% state of charge is obtained in less than 6 minutes.

3. The method of claim 1, wherein providing a lithium secondary cell comprises providing a cell wherein the area specific impedance of the total cell is localized predominantly at the positive electrode.

4. The method of claim 1, comprising charging the cell at a C-rate of 20C, wherein at least 80% state of charge is obtained in less than 3 minutes.

5. The method of claim 1, wherein providing a lithium secondary cell comprises providing a cell wherein the current capacity per unit area of the positive and negative electrodes each are at least 1.0 mA-h/cm$^2$.

6. The method of claim 1, wherein providing a lithium secondary cell comprises providing a cell wherein the charge capacity per unit area of the positive and negative electrodes each are at least 1.5 mA-h/cm$^2$.

7. The method of claim 1, wherein providing a lithium secondary cell comprises providing a cell wherein the total area specific impedance for the cell is less than about 20 $\Omega$-cm$^2$, and wherein the positive electrode has an area specific impedance $r_1$ and the negative electrode has an area specific impedance $r_2$, and wherein the ratio of $r_1$ to $r_2$ is at least about 10.

8. The method of claim 7, wherein providing a lithium secondary cell comprises providing a cell wherein the total area specific impedance for the cell is less than about 16 $\Omega$-cm$^2$ and wherein the ratio of $r_1$ to $r_2$ is at least about 7.

9. The method of claim 7, wherein providing a lithium secondary cell comprises providing a cell wherein the total area specific impedance for the cell is less than about 14 $\Omega$-cm$^2$ and wherein the ratio of $r_1$ to $r_2$ is at least about 6.

10. The method of claim 7, wherein providing a lithium secondary cell comprises providing a cell wherein the total area specific impedance for the cell is less than about 12 $\Omega$-cm$^2$ and wherein the ratio of $r_1$ to $r_2$ is at least about 5.

11. The method of claim 7, wherein providing a lithium secondary cell comprises providing a cell wherein the total area specific impedance for the cell is less than about 10 $\Omega$-cm$^2$ and wherein the ratio of $r_1$ to $r_2$ is at least about 4.

12. The method of claim 7, wherein providing a lithium secondary cell comprises providing a cell wherein the total area specific impedance for the cell is less than about 8 $\Omega$-cm$^2$ and wherein the ratio of $r_1$ to $r_2$ is at least about 3.

13. The method of claim 7, wherein providing a lithium secondary cell comprises providing a cell, wherein the current capacity per unit area of the positive and negative electrodes each are at least 1.5 mA-h/cm$^2$.

14. The method of claim 1, wherein providing a lithium secondary cell comprises providing a cell wherein the total area specific impedance for the cell is less than about 16 $\Omega$-cm$^2$.

15. The method of claim 1, wherein providing a lithium secondary cell comprises providing a cell, wherein the total area specific impedance for the cell is less than about 14 $\Omega$-cm$^2$.

16. The method of claim 1, wherein providing a lithium secondary cell comprises providing a cell wherein the total area specific impedance for the cell is less than about 12 $\Omega$-cm$^2$.

17. The method of claim 1, wherein providing a lithium secondary cell comprises providing a cell wherein the total area specific impedance for the cell is less than about 10 $\Omega$-cm$^2$.

18. The method of claim 1, wherein providing a lithium secondary cell comprises providing a cell wherein the negative electrode has an area specific impedance, $r_2$, of less than or equal to about 3.0 $\Omega$-cm$^2$.

19. The method of claim 1, wherein providing a lithium secondary cell comprises providing a cell wherein the negative electrode has an area specific impedance, $r_2$, of less than or equal to about 2.5 $\Omega$-cm$^2$.

20. The method of claim 1, wherein providing a lithium secondary cell comprises providing a cell wherein the negative electrode has an area specific impedance, $r_2$, of less than or equal to about 2.0 $\Omega$-cm$^2$.

21. The method of claim 1, wherein providing a lithium secondary cell comprises providing a cell wherein the negative electrode has an area specific impedance, $r_2$, of less than or equal to about 1.5 $\Omega$-cm$^2$.

22. The method of claim 1, wherein providing a lithium secondary cell comprises providing a cell wherein the positive electrode has a charge and discharge capacity measured at a C-rate of 10C that is greater than 90% of the nominal capacity measured at a C-rate of 1/10C.

23. The method of claim 1, wherein providing a lithium secondary cell comprises providing a cell wherein the conductivity of the positive electrode does not increase more than a factor of 2 over the state of charge.

24. The method of claim 1, wherein providing a lithium secondary cell comprises providing a cell wherein the conductivity of the positive electrode does not increase more than a factor of 5 over the state of charge.

25. The method of claim 1, wherein providing a lithium secondary cell comprises providing a cell wherein an electroactive material of the positive electrode comprises a lithium transition metal phosphate.

26. The method of claim 1, wherein providing a lithium secondary cell comprises providing a cell wherein the transition metal of the lithium transition metal phosphate comprises one or more of vanadium, chromium, manganese, iron, cobalt and nickel.

27. The method of claim 1, wherein providing a lithium secondary cell comprises providing a cell wherein the lithium transition metal phosphate is of the formula $(Li_{1-x}Z_x)MPO_4$, where M is one or more of vanadium, chromium, manganese, iron, cobalt and nickel, and Z is one or more of titanium, zirconium, niobium, aluminum, or magnesium, and x ranges from about 0.005 to about 0.05.

28. The method of claim 27, wherein Z is selected from the group consisting of zirconium and niobium.

29. The method of claim 1, wherein providing a lithium secondary cell comprises providing a cell wherein the positive electrode has a specific surface area of greater than about 10 m$^2$/g.

30. The method of claim 1, wherein providing a lithium secondary cell comprises providing a cell wherein the positive electrode has a specific surface area of greater than about 15 m$^2$/g.

31. The method of claim 1, wherein providing a lithium secondary cell comprises providing a cell wherein the positive electrode has a specific surface area of greater than about 20 m$^2$/g.

32. The method of claim 1, wherein providing a lithium secondary cell comprises providing a cell wherein the positive electrode has a specific surface area of greater than about 30 m$^2$/g.

33. The method of claim 1, wherein providing a lithium secondary cell comprises providing a cell wherein the position electrode has pore volume in the range of about 40% to about 70% by volume.

34. The method of claim 1, wherein providing a lithium secondary cell comprises providing a cell wherein the positive electrode has thickness in the range of about 50 μm to about 125 μm.

35. The method of claim 1, wherein providing a lithium secondary cell comprises providing a cell wherein the negative electrode comprises carbon.

36. The method of claim 1, wherein providing a lithium secondary cell comprises providing a cell wherein the negative electrode comprises graphitic carbon.

37. The method of claim 35, wherein the carbon is selected from the group consisting of graphite, spheroidal graphite, mesocarbon microbeads and carbon fibers.

38. The method of claim 35, wherein the carbon has an average particle size of less than about 25 µm.

39. The method of claim 35, wherein the carbon has an average particle size of less than about 15 µm.

40. The method of claim 35, wherein the carbon has an average particle size of less than about 10 µm.

41. The method of claim 35, wherein the carbon has an average particle size of less than about 6 µn.

42. The method of claim 1, wherein providing a lithium secondary cell comprises providing a cell wherein the negative electrode has pore volume in the range of about 20 and 40% by volume.

43. The method of claim 1, wherein providing a lithium secondary cell comprises providing a cell wherein the negative electrode has thickness in the range of about 20 µm to about 75 µm.

44. The method of claim 35, wherein the carbon has a fast diffusion direction parallel to the long dimension of the particle with a dimension less than 6*(diffusion coefficient of fast direction/diffusion coefficient of MCMB)$^{0.5}$ and a thickness less than about 75 microns and a porosity greater than 25%.

45. The method of claim 1, wherein the cell is charged at an overpotential.

46. The method of claim 1, wherein the cell is charged at a potential near the oxidation potential of the electrolyte.

47. The method of claim 1, wherein the cell is charged to about 90% state of charge within about 12 minutes, and wherein the cell charged and discharged with a capacity loss of less than about 0.1 % per cycle.

48. The method of claim 46, wherein the cell is charged and discharged with a capacity loss of less than about 0.05% per cycle.

49. A method of charging a lithium secondary cell, comprising:

(a) providing a lithium secondary cell, comprising:
a lithium-containing positive electrode having a thickness in the range of about 50 µm to about 125 µm in electronic contact with a positive electrode current collector, said current collector in electrical connection with an external circuit;
a negative electrode having a thickness in the range of about 20 µm to about 75 µm in electronic contact with a negative electrode current collector, said current collector in electrical connection with an external circuit;
a separator positioned between and in ionic contact with the cathode and the anode; and
an electrolyte in ionic contact with the positive and negative electrodes,
wherein the total area specific impedance for the cell and the relative area specific impedances for the positive and negative electrodes are such that, during charging at greater than or equal to 4C, the negative electrode potential is above the potential of metallic lithium; and
(b) charging the cell at a C-rate of at least 4C, wherein at least 95% state of charge is obtained in less than 15 minutes.

50. The method of claim 49, comprising charging the cell at a C-rate of 10C, wherein at least 90% state of charge is obtained in less than 6 minutes.

51. The method of claim 49, comprising charging the cell at a C-rate of 20C, wherein at least 80% state of charge is obtained in less than 3 minutes.

52. The method of claim 49, wherein the cell is charged at an overpotential.

53. The method of claim 49, wherein the cell is charged at a potential near the oxidation potential of the electrolyte.

54. The method of claim 1, wherein the cell is charged to about 90% state of charge within about 12 minutes, and wherein the cell charged and discharged with a capacity loss of less than about 0.1% per cycle.

55. The method of claim 2, wherein the cell is charged and discharged with a capacity loss of less than about 0.05% per cycle.

* * * * *